(12) United States Patent
Shin et al.

(10) Patent No.: US 6,434,301 B2
(45) Date of Patent: Aug. 13, 2002

(54) APPARATUS AND METHOD FOR FABRICATING MULTI-PERIOD OPTICAL FIBER GRATING

(76) Inventors: Sang-Gil Shin, San 14-1, Nongseo-ri, Kiheung-up, Yongin-shi, Kyonggi-do; Min-Sung Kim, 335 Yatap-dong, Puntang-gu, Songnam-shi, Kyonggi-do, both of (KR)

( * ) Notice: Subject to any disclaimer, the term of this patent is extended or adjusted under 35 U.S.C. 154(b) by 56 days.

(21) Appl. No.: 09/748,429

(22) Filed: Dec. 26, 2000

(30) Foreign Application Priority Data

Dec. 28, 1999 (KR) .............................. 99-64119

(51) Int. Cl.[7] ................................ G02B 6/34
(52) U.S. Cl. ...................................... 385/37
(58) Field of Search ....................... 385/37, 12, 13, 385/123, 147; 430/5, 321, 4; 264/1, 24, 1.27, 1.38; 216/24; 359/575

(56) References Cited

U.S. PATENT DOCUMENTS

| 4,807,950 | A | * | 2/1989 | Glenn et al. ................. 385/37 |
| 5,400,422 | A | * | 3/1995 | Askins et al. ................ 385/37 |
| 5,857,043 | A | * | 1/1999 | Cook et al. .................. 385/37 |
| 5,953,472 | A | * | 9/1999 | Boschis et al. ............... 385/37 |
| 6,174,648 | B1 | * | 1/2001 | Terao et al. ................. 430/321 |
| 6,344,298 | B1 | * | 2/2002 | Starodubov et al. ........... 430/5 |

FOREIGN PATENT DOCUMENTS

| JP | 2001-108844 | * | 4/2001 | ................. 385/37 |
| JP | 2000-174649 | * | 6/2001 | ................. 385/37 |

* cited by examiner

Primary Examiner—Rodney Bovernick
Assistant Examiner—Michael A. Stahl
(74) Attorney, Agent, or Firm—Klauber & Jackson

(57) ABSTRACT

Disclosed is an apparatus and method for fabricating a multi-period optical fiber grating. The apparatus includes an optical light source; a movable optical fiber having a first part of the optical fiber and at least a second part of the optical fiber bent from the first part and arranged substantially parallel with the first part of the optical fiber; and a multi-period amplitude mask including a first sector having a predetermined on-off ratio corresponding to the first part of the optical fiber and at least a second sector disposed substantially parallel with the first sector and having an on-off ratio different from the predetermined on-off ratio, wherein the mask position on top of the fiber is translated in relation to the light source so that the gratings of differing periods can be formed along the exposed optical fiber member.

6 Claims, 4 Drawing Sheets

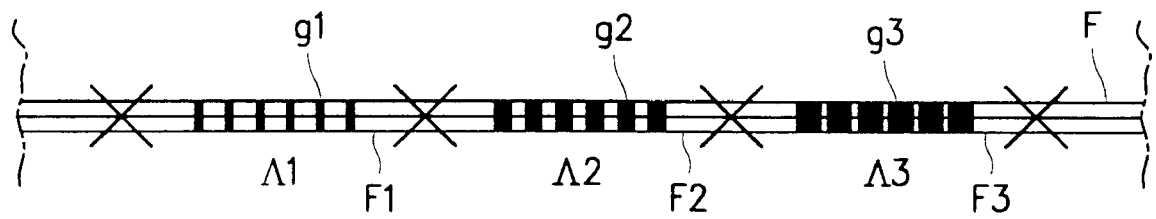
FIG. 1 [PRIOR ART]
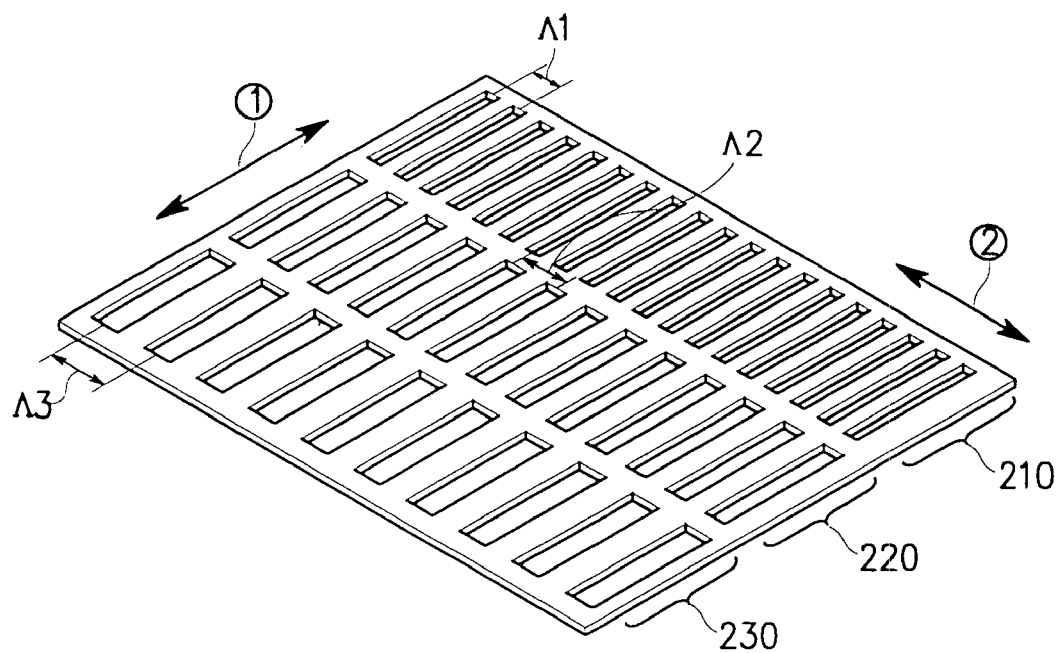
FIG. 2

APPARATUS AND METHOD FOR FABRICATING MULTI-PERIOD OPTICAL FIBER GRATING

CLAIM OF PRIORITY

This application makes reference to and claims all benefits accruing under 35 U.S.C. Section 119 from an application entitled, "Apparatus and Method for Fabricating Multi-Period Optical Fiber Grating", filed with the Korean Industrial Property Office on Dec. 28, 1999 and there duly assigned Ser. No. 99-64119.

BACKGROUND OF THE INVENTION

1. Field of the Invention

The present invention relates generally to a long-period optical fiber grating used as a gain equalized filter, and more particularly, to an apparatus and method for fabricating gratings of different periods.

2. Description of the Related Art

Fiber gratings are periodic variations in a refractive index along the length of a fiber. It is possible to make fibers in which the refractive index varies regularly along their length. These fibers are called fiber gratings as they interact with light, and their effects on light passing through them depend very strongly on the wavelength.

In general, an optical fiber grating is a row of fine parallel lines, usually on a reflective surface. Light waves bounce off the lines at an angle that depends on their wavelength. Thus, the fiber grating is used as a filter for selecting a predetermined wavelength directed to the particular core of an optical fiber as well as eliminating or reflecting light at a particular wavelength by periodically inducing the variance of a refractive index of the optical fiber through the provision of ultraviolet light. Ultraviolet light creates fiber gratings by breaking atomic bonds in the fiber member. Typically, the optical fiber grating is classified into a short-period optical fiber grating and a long-period optical fiber grating depending on its period of time.

A short-period optical fiber grating reflects a specific wavelength for performing a filtering function. In contrast, long-period grating (LPG) devices selectively remove light at specific wavelengths by coupling light from one optical mode of a fiber to another mode propagating in the same direction, with very low back-reflection. In particular, the long-period grating is utilized to couple light from a core mode to a cladding mode in the range from tens of kilometers to hundreds of kilometers, during which light at specific wavelengths can be removed. In essence, the long-period grating devices serve as a gain equalized filter in an erbium-doped optical fiber amplifier.

When the long-period grating is utilized as a gain equalized filter, there are some instances where the long-period grating requires multi-period gratings. FIG. 1 is a simplified diagram illustrating an optical fiber F with different long-period grating patterns according to the conventional art. Referring to FIG. 1, the long-period grating patterns, g1, g2 and g3, exhibiting gratings of differing periods are disposed along the optical fiber F in the direction of one axis. In this case, the notation, F1, F2 and F3 along the optical fiber represent the respective long-period grating patterns that are interconnected for use as a gain equalized filter.

The prior art system has some drawbacks as the gain equalizing long-period grating patterns have to be interconnected using a fusion splicer (or other similar alternatives). Moreover, the gain equalizing long-period grating patterns require an additional means, such as a contraction tube to secure the connection as the connected regions are easy to break. Furthermore, concise accuracy and costly high-tech equipment are required for the above interconnection process.

SUMMARY OF THE INVENTION

It is, therefore, an object of the present invention to provide an apparatus and method for fabricating a multi-period grating device using a multi-period amplitude mask with a plurality of on-off ratios.

It is another object of the present invention to provide an apparatus and method for fabricating a multi-period grating device with gratings of differing periods formed on a single optical fiber using a multi-period amplitude mask.

It is still another object of the present invention to provide an apparatus and method for fabricating a multi-period grating device in an economical way.

To achieve the above objects, there is provided an apparatus for fabricating a multi-period optical fiber grating, which includes: an optical source; an optical fiber having a first part of the optical fiber and at least one second part of the optical fiber continuously connected to the first part and arranged substantially in a parallel relationship with the first part of the optical fiber; and a multi-period amplitude mask disposed between the optical source and the optical fiber, wherein the multi-period mask comprises the first sector with a first on-off ratio corresponding to the first part of the optical fiber and at least one second sector being substantially parallel with the first sector with a second on-off ratio, and wherein gratings of differing periods can be fabricated by passing a light beam through the periodic first and second sectors of the mask.

BRIEF DESCRIPTION OF THE DRAWINGS

The above and other objects, features, and advantages of the present invention will become more apparent from the following detailed description when taken in conjunction with the accompanying drawings, in which:

FIG. 1 is a view illustrating the method for fabricating a gain equalized filter by interconnecting three long-period grating patterns having different periods, respectively, according to an embodiment of the conventional art;

FIG 2 is a cross view illustrating a multi-period amplitude mask having various on-off ratios according to a preferred embodiment of the present invention;

DETAILED DESCRIPTION OF THE PREFERRED EMBODIMENT

Figure 3A:
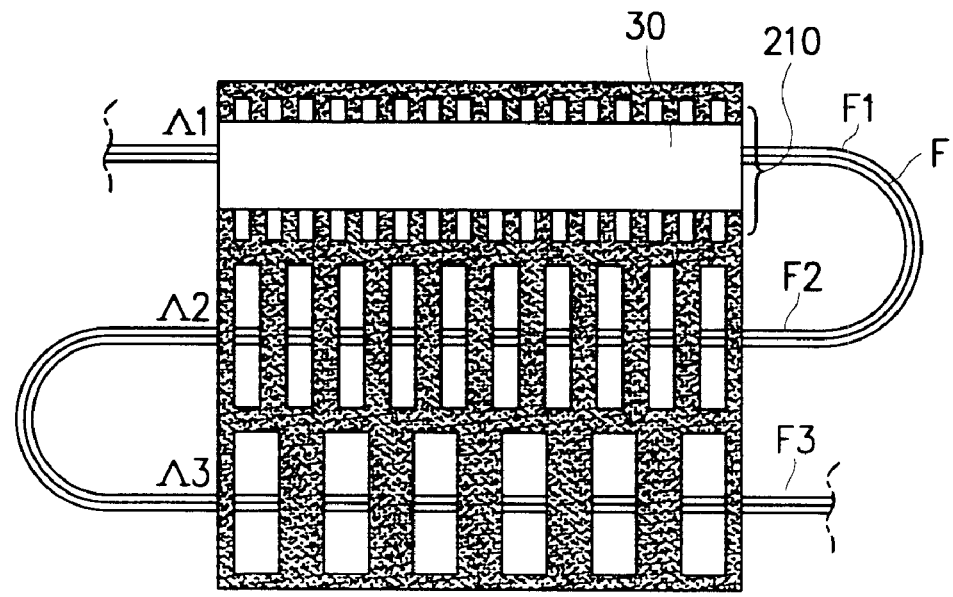
FIG. 3a to FIG. 3c are top views illustrating the apparatus and method for fabricating a long-period grating using a multi-period amplitude mask according to a preferred embodiment of the present invention; and, FIG. 4 is a view illustrating the optical fiber having grating patterns fabricated by using a multi-period amplitude mask according to a preferred embodiment of the present invention.

A preferred embodiment of the present invention will be described herein below with reference to the accompanying drawings. For the purpose of clarity, well-known functions or constructions are not described in detail as they would obscure the invention with unnecessary detail.

FIG. 2 is a cross view illustrating the amplitude mask used for fabricating an optical fiber grating according to the preferred embodiment of the present invention. Referring to FIG. 2, the amplitude mask according to the present invention is a multi-mask device, which includes different shapes and spacing between troughs. Multiple sets of a series of parallel apertures are used to fabricate gratings of differing periods by introducing an external ultraviolet light source through a different periodicity of the amplitude mask 20. Here, the on-off ratio represents a ratio of the refractive index of a core that is changed by the external light source and the refractive index of the core that is not affected by the light source.

The multi-period amplitude mask 20 shown in FIG. 2 contains the first sector 210 having a first predetermined on-off ratio, the second sector 220 having a second predetermined on-off ratio greater than the first on-off ratio, and the third sector 230 having a third predetermined on-off ratio greater than the second on-off ratio. These different sectors 210, 220, and 230 are integrally formed on a single amplitude mask. Here, the first, second, and third sectors 210, 220 and 230 in the multi-period amplitude mask 20 are arranged in a substantially parallel relationship with each other along the arrow direction indicated by number 2, and the parallel troughs in the respective on-off ratios are arranged in a parallel along the direction indicated by number 1. It should be noted that the amplitude mask 20 according to the present invention may include different patterns have various on-off ratios and many sectors.

Figure 3B:
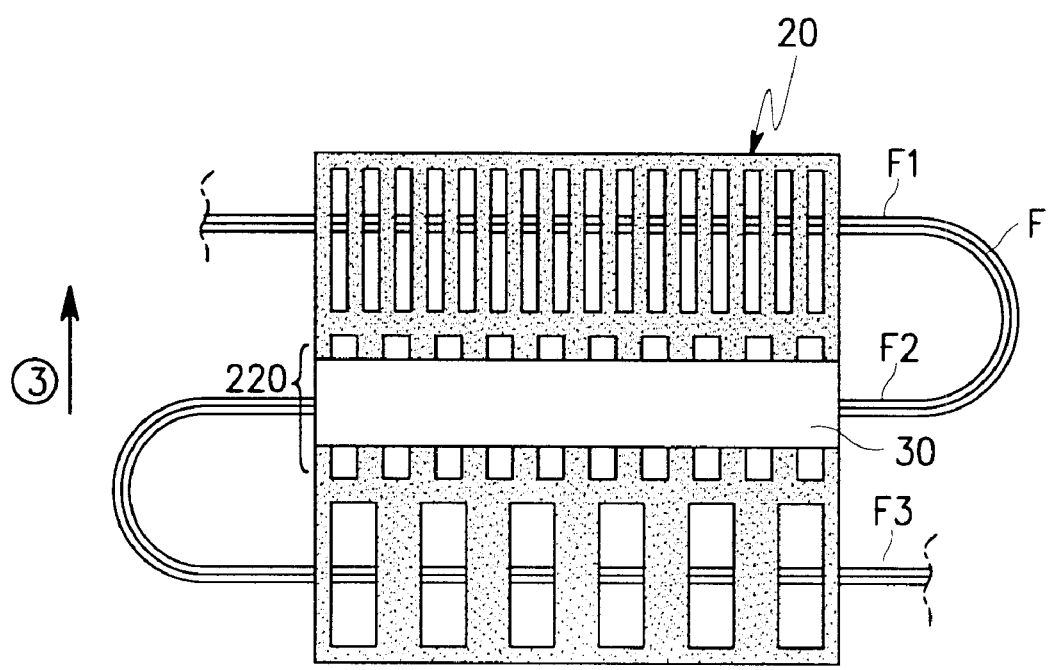

FIG. 3a to FIG. 3b are top views illustrating the method of fabricating a multi-period grating using the multi-period amplitude mask 20 according to the present invention. As shown in FIG. 3, the inventive apparatus includes an optical light source 30, an optical fiber F where gratings of different periods are formed through the provision of light beams emitted from the optical light source 30, and a multi-period amplitude mask 20 with multiple rows of parallel troughs for generating different patterns on the optical fiber F. It is noted that any light source that is apparent to those in the art for creating ultraviolet light beams may be incorporated in the present invention. A cylindrical convex lens, which is not drawn in FIG. 3a and FIG. 3b, may be optionally disposed between the optical light source 30 and the multi-period amplitude mask 20 to maximize the light efficiency. In the inventive method of fabricating the multi-period grating device, the optical light source 30 is located in a fixed position and the multi-period amplitude mask 20 and the optical fiber F are selectively translated in a spaced relation to the optical light source 30.

With reference to FIGS. 3A and 3B, the optical fiber F is bent around several times to form the first part F1, the second part F2 and the third part F3, and the respective parts of the optical fiber are aligned substantially parallel to each other. It should be noted that the optical fiber F may be bent a few more times in a similar manner depending on the number of on-off ratio sections provided in the amplitude mask. Accordingly, the gain equalizing long-period grating device with different periods can be fabricated by passing a light beam through the inventive multi-period amplitude mask 20.

Referring to FIG. 3a, an optical light source 30 is positioned above one end of the optical fiber. The first sector 210 of the multi-period amplitude mask 20 is disposed between the optical light source 30 and the optical fiber F. The first part F1 of the optical fiber is positioned below the first sector 210. To be specific, the optical source 30, the first sector 210, and the first part F1 of the optical fiber are positioned along the same line. If the optical source 30 emits light beams, long-period grating patterns with gratings of Λ1 period are formed in plurality on the first part FI of the optical fiber. As shown in FIG. 3b, the multi-period amplitude mask 20 and the optical fiber F are slidably movable in an arrow direction (indicated by number 3) through the means of a carrier, which is not drawn in FIG. 3b.

In a similar fashion, the amplitude mask 20 and the second part F2 of the optical fiber are moved so that the second sector 220 of the multi-period amplitude mask 20 is positioned below the fixed optical light source 30. The optical light source 30, the second sector 220, and the second part F2 of the optical fiber are aligned along the same line so that the second part F2 of the optical fiber can be exposed to the light emitted through the second sector 220 of the amplitude mask 20. If ultraviolet beams are emitted by the optical source 30, optical fiber grating patterns with gratings of Λ2 period are formed along the second part F2 of the optical fiber.

Figure 3C:
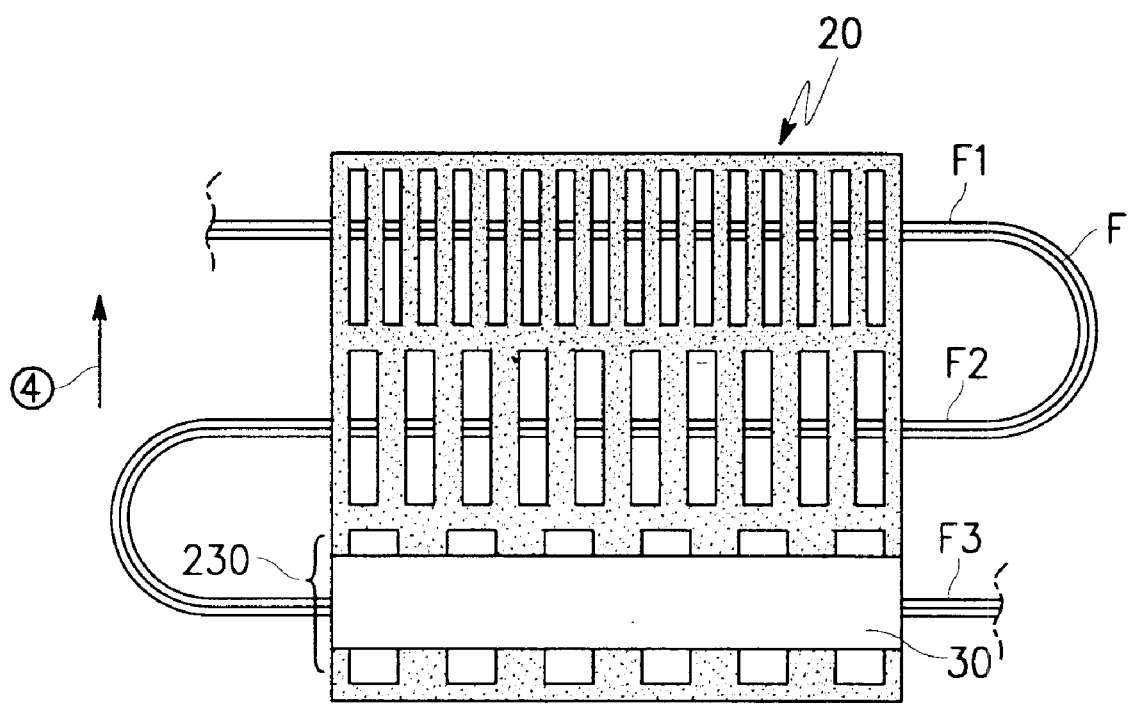

Thereafter, as shown in FIG. 3c, the multi-period amplitude mask 20 and the optical fiber F are moved in the direction (indicated by an arrow 4) so that the third sector 230 of the multi-period amplitude mask is positioned between the fixed optical light source 30 and the third part F3 of the optical fiber along the same line. Upon receiving the ultraviolet beams emitted from the optical source 30, optical fiber grating patterns with gratings of Λ3 period are formed on the third part F3 of the optical fiber.

It should be noted that different extinction ratios and bandwidths of the respective grating patterns can be adjusted by varying the emitted amount of the ultraviolet beams and the lengths of the grating patterns. Peak wavelengths of the grating patterns also can be adjusted by varying the respective periods of the amplitude mask.

Figure 4:
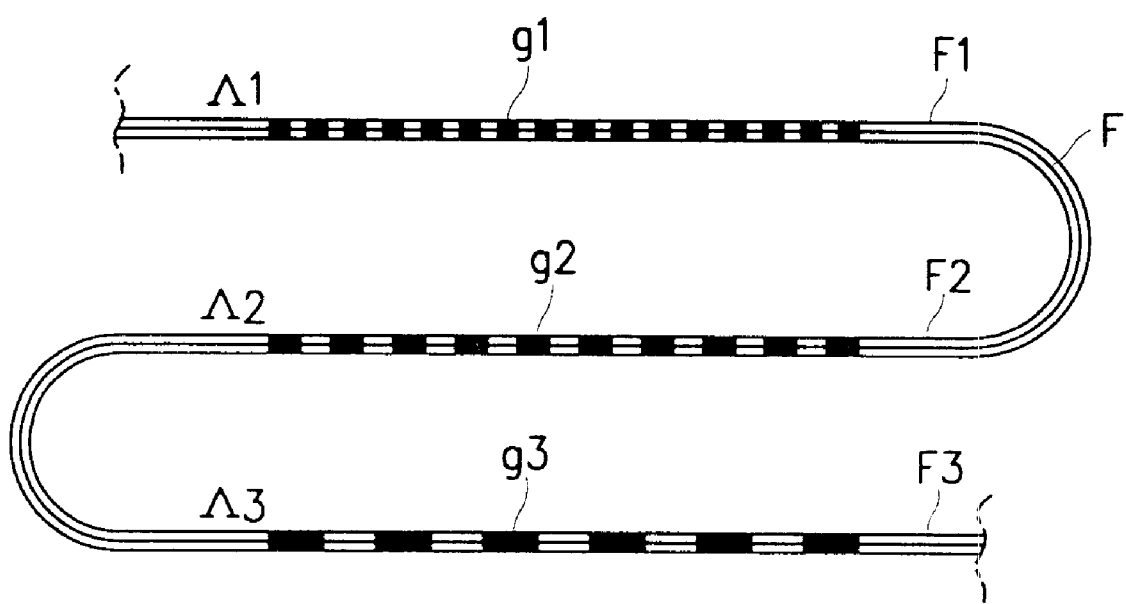

FIG. 4 is a view illustrating different grating patterns that are formed on an optical fiber by using the multi-period amplitude mask according to the present invention. Referring to FIG. 4, a grating pattern of g1 with Λ1 period is formed on the first part F1 of the optical fiber, a grating of Λ2 period is formed on the second part F2 of the optical fiber, and a grating of Λ3 period is formed on the third part F3 of the optical fiber. By providing the optical light source 20 in a fixed position while moving the multi-period amplitude mask 20 and the optical fiber in one direction at a predetermined velocity, a long-period optical fiber grating having various on-off ratios can be formed efficiently on a single optical fiber without splicing operation and the costly equipment that is required in the prior art between the respective parts of the optical fiber.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. An apparatus for fabricating a multi-period optical fiber grating, comprising:
   means for generating an optical light beam;
   a continuous optical fiber member having a first part and at least a second part, said second part bent around so that said first part is in a substantially parallel relationship with said second part of said optical fiber; and,
   a multi-period amplitude mask disposed between said light generating means and said optical fiber, said mask having a first sector with a first series of troughs defining a first predetermined on-off ratio responsive to said first part of said fiber member and at least a second sector with a second series of troughs defining a second predetermined on-off ratio responsive to said second part of said fiber member.

2. The apparatus of claim 1, wherein said first and second sectors of said mask are arranged substantially parallel with each other.

3. The apparatus of claim 1, wherein said first and second sectors of said mask are integrally formed.

4. The apparatus of claim 1, wherein said mask position on top of said optical fiber member is translated with respect to said optical light source for allowing the light beam through said respective sector of said mask to form the grating of differing periods.

5. The apparatus of claim 1, further comprising a lens device disposed between said light generating means and said mask for enhancing the light effect of said light generating means.

6. A method for fabricating an optical fiber grating using a device, which includes a fixed optical light source; a continuous optical fiber having a first part and at least a second part bent portion being substantially parallel with said first part; and a multi-period amplitude mask having a first sector having a first on-off ratio corresponding to said first part of said optical fiber and at least a second sector in a parallel relationship with said first sector having a second on-off ratio, the method comprising the steps of:

providing said first sector of said mask positioned on the top of said first part of said optical fiber under said optical light source;

introducing light beams emitted from said optical light source through said first sector of said mask to form grating patterns of a first period on said first part of said optical fiber;

moving said mask and said optical fiber so that said second sector of said mask positioned on the top of said second part of said optical fiber is located under said optical light source; and, introducing light beams emitted from said optical light source through said second sector of said mask to form grating patterns of a second period on said second part of said optical fiber.

* * * * *

UNITED STATES PATENT AND TRADEMARK OFFICE
CERTIFICATE OF CORRECTION

PATENT NO. : 6,434,301 B2
DATED : August 13, 2002
INVENTOR(S) : Sang-Gil Shin and Min-Sung Kim It is certified that error appears in the above-identified patent and that said Letters Patent is hereby corrected as shown below:

<u>Title page,</u>
Item [73], Assignee, should read as follows:

-- Samsung Electronics Co., Ltd.
  416, Maetan-Dong, Paldal-Gu
  Suwon-City, Kyungki-do, Korea
  Republic of Korea --

Signed and Sealed this

Twelfth Day of October, 2004

JON W. DUDAS
*Director of the United States Patent and Trademark Office*